US011945242B2

(12) United States Patent
Ruoff

(10) Patent No.: US 11,945,242 B2
(45) Date of Patent: Apr. 2, 2024

(54) PRINTING MACHINE AND METHOD FOR CHANGING A COLOR SEQUENCE WITHIN A PRINTING PROCESS

(71) Applicant: BOBST MEX SA, Mex (CH)

(72) Inventor: Wolfgang Ruoff, Lörrach (DE)

(73) Assignee: BOBST MEX SA, Mex (CH)

( * ) Notice: Subject to any disclaimer, the term of this patent is extended or adjusted under 35 U.S.C. 154(b) by 213 days.

(21) Appl. No.: 17/647,990

(22) Filed: Jan. 14, 2022

(65) Prior Publication Data

US 2022/0227143 A1 Jul. 21, 2022

(30) Foreign Application Priority Data

Jan. 19, 2021 (EP) .................................... 21152297

(51) Int. Cl.
*B41J 3/407* (2006.01)
*B41J 15/04* (2006.01)

(52) U.S. Cl.
CPC ............. *B41J 3/4075* (2013.01); *B41J 15/04* (2013.01)

(58) Field of Classification Search
CPC ........ B41J 3/4075; B41J 15/04; B41J 15/165; B41J 3/407; B41J 2/442; B41J 2/2117; B41J 2/21; B41J 2202/21; B41J 11/00214; B41J 3/543; B41J 3/54; B41J 29/02; B41J 29/00; B41J 29/023; B41J 29/026
See application file for complete search history.

(56) References Cited

U.S. PATENT DOCUMENTS

2004/0189772 A1 9/2004 Arai

FOREIGN PATENT DOCUMENTS

EP 3626454 A1 * 3/2020 ............ B41J 11/002
EP 3626454 A1 3/2020
JP 2012148576 A 8/2012

* cited by examiner

*Primary Examiner* — Kristal Feggins
(74) *Attorney, Agent, or Firm* — Bookoff McAndrews, PLLC

(57) ABSTRACT

A printing machine (10) for printing on a substrate having the form of a web (12) is described. It comprises a web entry unit (14) for receiving the web (12) on which a printing process is to be performed and a web exit unit (20) for dispensing the web (12) after the printing process. Furthermore, at least two printing units (26, 28, 30, 32, 34, 36, 38) are provided, wherein each of the printing units (26, 28, 30, 32, 34, 36, 38) is configured for applying an ink of a predetermined color on the web (12). Additionally at least two web paths (A, B) are provided between the web entry unit (14) and the web exit unit (20), each of the web paths (A, B) passing by all of the printing units (26, 28, 30, 32, 34, 36, 38). The web paths (A, B) pass the printing units (26, 28, 30, 32, 34, 36, 38) in a differing sequence. Moreover, a method for changing a color sequence within a printing process is presented. According to this method, the web (12) is arranged along an alternative web path (A, B) passing by the printing units (26, 28, 30, 32, 34, 36, 38) in a differing sequence, whereas a travelling direction of the web remains the same.

18 Claims, 1 Drawing Sheet

Figure 1:
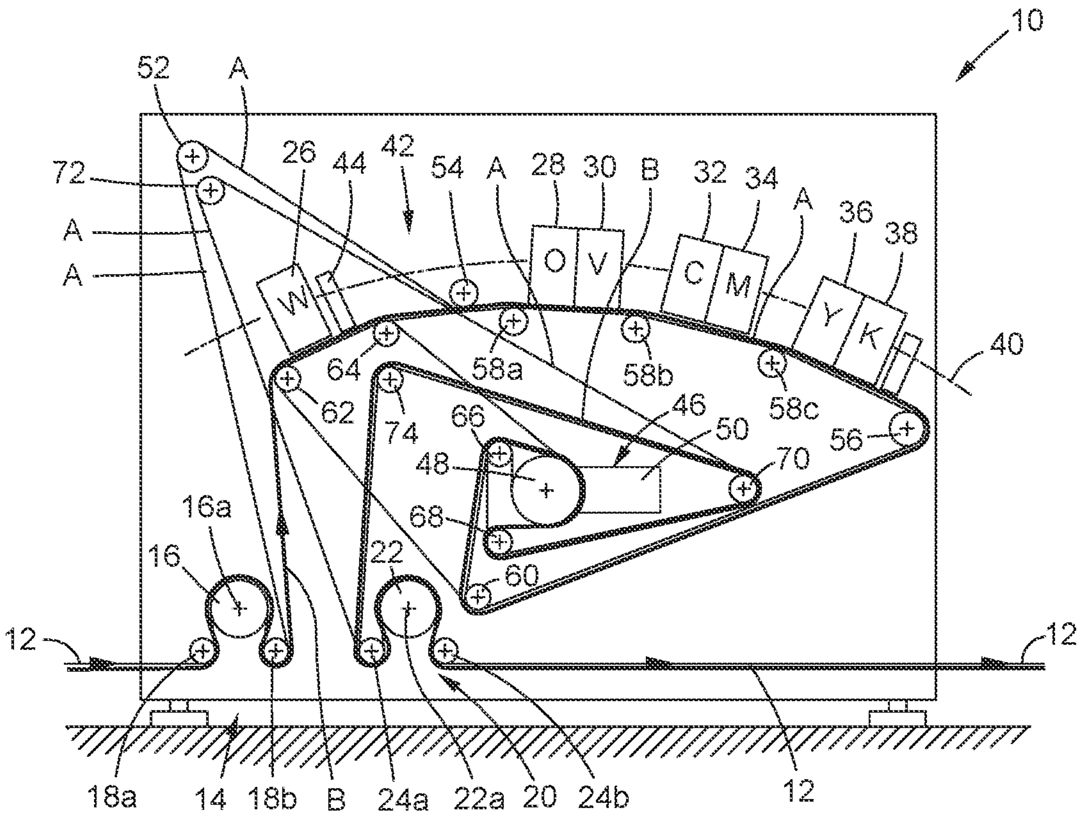

PRINTING MACHINE AND METHOD FOR CHANGING A COLOR SEQUENCE WITHIN A PRINTING PROCESS

CROSS-REFERENCE TO RELATED APPLICATION(S)

This patent application claims the benefit of priority to European Application No. 21152297.4, filed on Jan. 19, 2021, the entirety of which is incorporated herein by reference.

The invention relates to a printing machine, like for example label printing machine and machine for printing flexible packaging, for printing on a substrate having the form of a web. The printing machine comprises a web entry unit for receiving the web on which a printing process is to be performed and a web exit unit for dispensing the web after the printing process. Moreover, at least two printing units are provided, wherein each of the printing units is configured for applying an ink of a predetermined color on the web.

The invention is additionally directed to a method for changing a color sequence within a printing process, especially a label printing process, performed by a printing machine configured for printing on a substrate having the form of a web and comprising at least two printing units, wherein each of the printing units is configured for applying an ink of a predetermined color on the web.

Such printing machines are known in the art. In this context, a substrate having the form of a web is to be seen in contrast to a substrate having the form of a sheet. Sheets are discrete portions of substrate, wherein a web often is described as being endless.

In the fields of labels applications are known in which a substrate having a printed image on it is used in the final product such that the substrate forms a base and the printed image forms an outside. Consequently, the substrate is behind the printed image. This is for example the case for so-called wrap-around labels which may be glued onto a product or a packaging. The substrate may be transparent or metallized.

Alternatively, the substrate with the printed image may be used in the final product such that the substrate forms an outside and the printed image is only visible through the substrate, i.e. the printed image is behind the substrate. This is for example the case for shrink sleeve labels or flexible packaging films.

The above alternatives may require that the colors be printed on the substrate in a different sequence. This can best be understood when considering the color white. In cases where the substrate is behind the printed image, the white color is applied as a first color and the remaining colors are printed on top of the white color. This leads to a printed image of high quality, wherein the colors appear in the desired tone. However, in cases where the printed image is behind the substrate, the white color needs to be applied as last color such that, wherever suitable, the remaining colors may appear on a white background.

Known printing machines usually provide a fixed sequence of the printing units. Consequently, using the above example, a known printing machine is either suitable for printing white as a first color or for printing white as a last color. Thus, two printing machines are necessary for covering both of the above mentioned alternatives. Alternatively two or more different printing units for printing white could be installed (one at the beginning and one at the end of the printing sequence).

The problem to be solved by the invention is, thus, to provide a more flexible printing machine. The printing machine shall especially be able to print colors in differing sequences.

The problem is solved by a printing machine of the type mentioned above, wherein at least two web paths are provided between the web entry unit and the web exit unit. Each of the web paths passes by all of the printing units, wherein the web paths pass by the printing units in a differing sequence and whereas a travelling direction of the web remains the same. Consequently, the sequence by which the colors associated with the respective printing units are applied to the substrate may be determined by choosing the appropriate web path. Preferably, the web paths are alternatives. Thus, within the printing machine, the web can only be arranged along one of the web paths at a time. However, this does not exclude that the web paths have common portions. As the travelling direction of the web remains the same, the unwind and rewind unit also remain. Such a printing machine is able to print on the substrate by having the printed image on a front side of the substrate and having the printed image on a back side of the substrate, i.e. the substrate may be in front or behind the printed image in the final product. More generally, such a printing machine is very flexible. It may especially replace two printing machines being adapted for printing fixed, but different color sequences.

The printing machine according to the invention is able to print the web on different paths through the machine in one travelling direction and without necessarily modifying the printing machine. The different web paths are provided by different web-in. Such a machine may be able to accommodate also further inline converting modules/units, like e.g. a die-cutting or a flexo-unit for another application (e.g. cold foil). These modules/units need to be passed by the web after being printed. This is not possible in machines where the travelling direction is changed.

As the travelling direction remains unchanged in the printing machine, also the color sequence can remain. If the travelling direction of the web is changed, in one direction CMYK is printed and in the other direction KYMC is printed. Depending on the image, this can result in different colors (printing color on top of each other).

According to the invention it is possible to not change the color ink sequence by changing the web path.

The change of the web path might for example allow to web-in to first print white and then printing the colors or with a different web-in to first print the colors and then printing white on top.

According to the invention it is possible, that the machine remains the same and no changes on the machine are necessary, only the web will be pulled in differently and the travelling direction of the web always remains the same.

All of the printing units may be arranged along a substantially straight or arched line. This leads to a simple and compact structure of the printing machine. Such a printing machine may be easily maintained since the printing units provide good accessibility. Furthermore, it can be produced with comparatively low efforts.

Moreover, all of the at least two printing unit may have a respective front side and a respective backside being arranged opposite the front side. Preferably, the printing units are configured for dispensing ink from the respective front side and all front sides are oriented towards a process space of the printing machine. This means that all front sides are substantially oriented in the same direction. Such a printing machine has a simple and well-arranged structure. This is advantageous during production and maintenance of the printing machine.

According to a variant, the entry unit and the exit unit are arranged on the same side of the printing units. Thus, the printing machine is compact.

The entry unit of a printing machine according to the invention may comprise a roller assembly for providing the printing process being performed inside the printing machine with web at an appropriate, e.g. constant, speed and with an appropriate tension.

Accordingly, also the exit unit of a printing machine according to the invention may comprise a roller assembly for dispensing the web from the printing machine at an appropriate, e.g. constant, speed and with an appropriate tension.

It is possible that a gap is located between the printing units, wherein only a first one of the at least two web paths comprises a portion extending through the gap. This means that a second one of the at least two web paths does not pass through the gap. As a result of this configuration the web path passing through the gap can pass around one of the at least two printing unit at the respective backside and then interact with the front side of the remaining printing unit. This is an easy way for providing alternative web paths. Moreover, web paths created in this way may be arranged in close proximity to one another and to the parts of the printing machine, e.g. the printing units. This leads to a compact design of the printing machine.

The first one of the at least two web paths may, along its travelling direction, extend through the gap, subsequently pass by a second one of the printing units and subsequently pass by a first one of the printing units. It is understood that the printing units may apply an ink to a substrate passing by them. Consequently, ink of a color provided by the second one of the printing units may be applied on the substrate before ink of a color provided by the first one of the printing units is applied thereto. In other words, a first color sequence is provided.

Additionally, the first one of the at least two web paths, along its travelling direction, may extend through the gap after having passed by the first one of the printing units. Thus, the first web path extends twice through the gap. This configuration facilitates the provision of alternative color sequences.

In an embodiment, a second one of the at least two web paths, along its travelling direction, passes by a first one of the printing units and subsequently passes by a second one of the printing units. Again, it is understood that the printing units may apply an ink to a substrate passing by them. Consequently, ink of a color provided by the first one of the printing units may be applied on the substrate before ink of a color provided by the second one of the printing units is applied thereto. In other words, a second, alternative color sequence is provided.

The printing units may be ink jet printing units or laser printing units. This means that the printing units operate according to the ink jet principle or the laser printing principle. Both technologies can be used for creating high quality prints at comparatively low costs.

A printing machine having an ink jet printing unit or a laser printing unit may be designated a digital printing machine since the image to be printed may be transferred directly from a file or data stream from a computer device to the printing machine. Printing forms of any sort are not necessary. Consequently, digital printing machines are especially suitable for printing jobs of small lot sizes.

In an alternative, at least one pinning unit is provided. In particular, the pinning unit is arranged adjacent to one of the printing units. An ink may be pre-cured by such a pinning unit. Consequently, ink applied to the substrate by one of the printing units is partly, e.g. surface cured before ink of another one of the printing units is applied to the substrate. This leads to an improved quality of the printed image. If ultraviolet (UV) light curable ink is used, the pinning unit may comprise a pinning lamp for applying a dose of UV light thereto.

In this context, at least two coupling units for mounting the pinning unit within the printing machine may be provided, wherein the pinning unit may be selectively coupled to any one of the coupling units. Thus, depending on the printing job to be performed, the pinning unit can be provided at an appropriate location within the printing machine. This leads to high quality printing results. It is understood that also more than two coupling units and thus more than two alternative locations for the pinning unit may be provided.

In an embodiment, at least three printing units are provided, being subdivided into two printing unit groups, wherein the at least two web paths pass by the at least two printing unit groups in a differing sequence. Such a configuration is especially useful, if alternative sequences with respect to a single color or a group of colors need to be provided. It is noted that a printing unit group comprises at least one printing unit.

For example, five printing units are provided. Each printing unit is adapted for applying ink of one specific color on the substrate. The printing units may be adapted for printing the colors cyan, magenta, yellow, black and white. The printing units adapted for printing cyan, magenta, yellow and black may form a first group. Since the color black often is designated as key, the colors being printable by the first group may be abbreviated as CMYK. The printing unit adapted for printing white color ink forms the second group. In this configuration a first web path passes by the printing units CMYK first and subsequently by the printing unit adapted for printing white ink. A second, alternative web path passes by the printing unit adapted for printing white ink first and then passes by the printing units CMYK.

In another example, seven printing units are provided. Printing units being adapted for printing the colors orange, violet, cyan, magenta, yellow and black respectively form a first printing unit group. This group may be designated OVCMYK using the respective first letters of the colors wherein black is termed key. A second group may again be formed by a printing unit being adapted for applying white ink on the substrate. In this configuration a first web path passes by the printing units OVCMYK first and subsequently by the printing unit adapted for printing white ink. A second, alternative web path passes by the printing unit adapted for printing white ink first and then passes by the printing units OVCMYK.

In both of the above examples, the first path is well adapted for so-called direct prints on e.g. transparent or metallized substrates being used as labels. The second path is well adapted for printing shrink sleeve labels or flexible packaging films wherein the final image is visible through the transparent substrate.

It is noted that it would theoretically also be possible to provide two white printing units within the printing machine, wherein along a web path one is arranged in front of the remaining colors and the other one is arranged behind the remaining colors. During operation of the printing machine only one of these white printing units is active.

Consequently, white color could selectively be printed as first or last color. However, such a solution is far more expensive than the solution using two alternative web paths as described above.

The printing machine may comprise a curing unit, wherein the curing unit is arranged between the at least two printing units and the web exit unit in respect of all of the web paths. Consequently, a substrate with a well-cured ink will leave the printing machine. The curing unit is for example an UV curing unit or a heat curing unit.

Preferably, each of the printing units has a single, fixed position within the printing machine. Thus, the printing units are neither movable nor are alternative positions provided for the printing units. Consequently, the printing units may be fixedly mounted on a machine frame or housing. Such a printing machine is structurally simple, reliable in operation and compact in design.

Advantageously, the printing machine comprises one single printing unit per color. This also leads to structural simplicity.

The problem is also solved by a method for changing a color sequence within a printing process as mentioned above, wherein the web is arranged along an alternative web path passing by the printing units in a differing sequence. It is noted that the method is a method for changing a color sequence. This means that a starting point for the method is a given color sequence which is realized by a given web path passing by the printing units. This method can be performed in a relatively short amount of time such that a printing machine can be flexibly used as far as the sequence of colors is concerned.

The invention will now be explained with reference to two embodiments which are shown in the attached drawings. In the drawings, FIG. 1 shows a printing machine according to the invention, wherein a method according to the invention can be performed with this printing machine, and FIG. 2 shows a slightly modified printing machine according to the invention, wherein also in connection with the slightly modified printing machine a method according to the invention can be performed.

Figure 2:
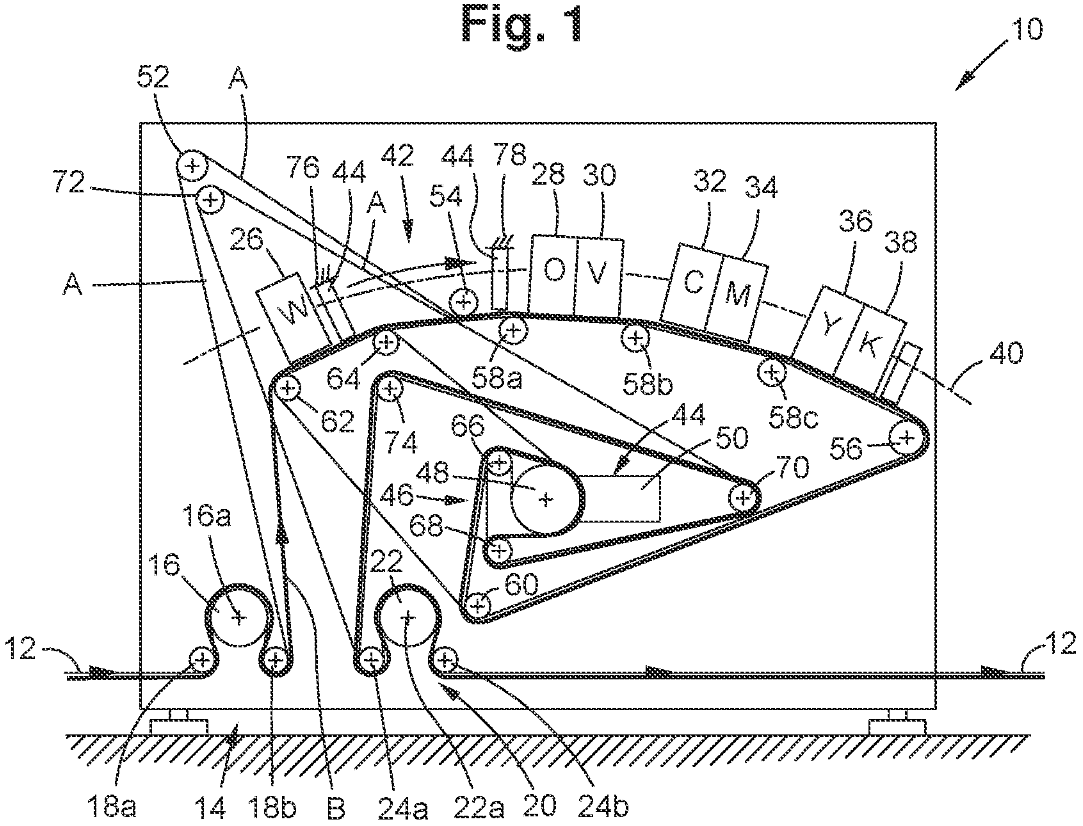

FIG. 1 shows a printing machine 10 which is configured as a label printing machine.

Furthermore, the printing machine is configured for printing on a substrate having the form of a web 12.

The printing machine 10 comprises a web entry unit 14 for receiving the web 12 on which a printing process is to be performed.

The web entry unit 14 has an entry roller 16 and two auxiliary entry rollers **18*a*, 18*b***.

The entry roller 16 and the auxiliary entry rollers **18*a*, 18*b*** are rotatable around respective axes of rotation which are arranged in parallel.

In the example shown the auxiliary entry rollers **18*a*, 18*b* are arranged below the entry roller 16**. This is one possibility, but the entry rollers or at least one of them could be also be arranged above the entry roller according to another embodiment. The auxiliary rollers mainly have the function to have a good wrapping of the entry roller, to avoid any slipping of the substrate on the roller and so to ensure a stable web tension.

Moreover, auxiliary entry roller **18*a* is arranged on a first lateral side of an axis 16*a* of rotation of the entry roller 16 wherein auxiliary entry roller 18*b* is arranged on a second lateral side of the axis 16*a*** of rotation. The second lateral side is opposed to the first lateral side.

The printing machine 10 also comprises a web exit unit 20 for dispensing the web 12 after the printing process.

The web exit unit 20 is configured in a similar manner as the web entry unit 14.

It comprises an exit roller 22 being rotatable around a corresponding axis **22*a*** of rotation.

Furthermore, two auxiliary exit rollers **24*a*, 24*b*** are provided.

The auxiliary exit rollers **24*a*, 24*b* are rotatable around respective axes of rotation which are arranged in parallel to the axis 22*a* of rotation of the exit roller 22**.

In the example shown the auxiliary exit rollers **24*a*, 24*b* are arranged below the exit roller 22. Moreover, the auxiliary exit roller 24*a* is arranged on a first lateral side of the axis 22*a* of rotation of the exit roller 22 and the auxiliary exit roller 24*b* is arranged on a second lateral side of the axis 22*a*** of rotation. The second lateral side is opposed to the first lateral side.

Additionally, the printing machine 10 comprises a total of seven printing units being designated by reference signs 26 to 38.

Printing unit 26 is configured for applying an ink of white color on the web 12. Consequently the printing unit 26 is also designated a white printing unit or by the letter W.

Printing unit 28 is configured for applying an ink of orange color on the web 12. Thus, the printing unit 28 is also designated an orange printing unit or by the letter O.

Printing unit 30 is configured for applying an ink of violet color on the web 12. Accordingly, the printing unit 30 is also designated a violet printing unit or by the letter V.

Printing unit 32 is configured for applying an ink of cyan color on the web 12. The printing unit 32 is also designated a cyan printing unit or by the letter C.

Printing unit 34 is configured for applying an ink of magenta color on the web 12. Consequently the printing unit 34 is also designated a magenta printing unit or by the letter M.

Printing unit 36 is configured for applying an ink of yellow color on the web 12. Therefore, the printing unit 36 is also designated a yellow printing unit or by the letter Y.

Printing unit 38 is configured for applying black ink on the web 12. Thus, the printing unit 38 is also designated a black printing unit or by the letter K. This designation is due to the fact that black ink often is also called key.

Consequently, the printing machine 10 comprises one single printing unit 26 to 38 per color.

The color sequence of the print section as described by example could also be different. The example is described by using OV-CMYK, but all other combinations are possible, e.g. also CMYK-OV.

In the examples shown in the figures, the printing units 26 to 38 are ink jet printing units.

Furthermore, all printing units 26 to 38 are arranged along a slightly arched line 40.

Each of the printing units 26 to 38 has a single, fixed position along this line 40 and thus within the printing machine 10.

Moreover, the respective front sides of the printing units 26 to 38, i.e. the sides from which the printing units 26 to 38 may apply ink to the web 12 are all oriented towards the same side, in the example shown a lower side of the printing machine 10.

Furthermore, printing units 28 and 30 are arranged adjacent to one another and form a first printing unit pair.

In an analogous manner, printing units 32 and 34 are arranged adjacent to one another and form a second printing unit pair.

Also printing units 36 and 38 are arranged adjacent to one another. They form a third printing unit pair.

Printing unit 26 is not paired with another one of the printing units 28 to 38.

Furthermore, a gap 42 is provided between the printing unit 26 and the first printing unit pair, more precisely the printing unit 28. This gap 42 is configured such that the web 12 may pass therethrough as will be explained below.

The gap 42 also separates the printing units 26 to 38 into two printing unit groups, wherein a first printing unit group is formed by printing units 28 to 38 and a second printing unit group is formed by printing unit 26.

It is noted that also between the printing units 30 and 32 as well as between the printing units 34 and 36 a certain spacing is provided. However, this spacing is considerably smaller than the gap 42. As will be explained later, the web 12 does not extend through these spacings. Thus, the spacings will not be designated as gaps.

In the configuration of the printing machine 10 as shown in the Figures, the printing units 26 to 38 are arranged above the entry unit 14 and the exit unit 20. In other words, the entry unit 14 and the exit unit 20 are arranged on the same side of the printing units 26 to 28 which is a lower side in the examples shown.

The printing machine 10 also comprises a pinning unit 44. The pinning unit 44 is used for pre-curing ink applied to the web 12.

In the example of FIG. 1 the pinning unit 44 is arranged adjacent to printing unit 26.

The printing machine 10 is also equipped with a curing unit 46.

The curing unit 46 comprises a supporting roller 48 which is optionally chilled and a curing energy source 50.

In the examples shown, the curing energy source 50 comprises a UV light source configured for curing UV light sensitive inks.

Moreover, within the printing machine 10 two alternative web paths A, B are provided between the web entry unit 14 and the web exit unit 20.

A first web path A along which the web 12 may travel through the printing machine 10 starts at the entry unit 14 where the web 12 is wound around the first auxiliary entry roller 18, the entry roller 16 and the second auxiliary entry roller 18*b*.

Thereafter, the web path A extends to a first deviating roller 52 which is generally arranged above the entry unit 14.

The first deviating roller 52 is also arranged at a backside of the printing units 26 to 38, i.e. above the printing units 26 to 38.

From there, the first web path A extends through the gap 42 to a second deviating roller 54 being arranged at an end of the gap 42.

In doing so, the first web path A has circumvented the printing unit 26 at its backside.

The first web path A continues to pass by the printing units 28 to 38 at a respective front side thereof until it reaches a third deviating roller 56.

In between the deviating rollers 54 and 56, the web 12 travelling along the first web path A is supported by a total of three supporting rollers 58*a*, 58*b*, 58*c*.

Using deviating rollers 54 and 56 and supporting rollers 58*a*, 58*b*, 58*c* the web 12 travelling along the first web path A is precisely positioned with respect to the printing units 28 to 38.

The first web path A further extends from the third deviating roller 56 to a fourth deviating roller 60 which is substantially arranged below the curing unit 46.

From there it continues to a fifth deviating roller 62 and further to a sixth deviating roller 64.

The portion of the first web path A extending between the fifth deviating roller 62 and the sixth deviating roller 64 passes by the front side of the printing unit 26 and by the pinning unit 44 which is arranged adjacent to the printing unit 26.

Consequently, white ink can be applied to the web 12 and pre-cured by the pinning unit 44.

After that, the first web path A continues to the curing unit 46, more precisely to the supporting roller 48.

The ink applied to the web 12 by the printing units 26 to 38 can now be fully cured.

From the supporting roller 48, the first web path A extends over a seventh deviating roller 66 and an eights deviating roller 68 to a ninth deviating roller 70.

Thereafter, it passes again through the gap 42 until it reaches a tenth deviating roller 72.

Subsequently, the first web path A extends to the exit unit 20.

Since the first web path A first passes by the printing units 28 to 38, i.e. by the printing units being adapted for applying ink of orange, violet, cyan, magenta, yellow and black color to the web 12 and subsequently passes by printing unit 26, which is adapted for applying white ink to the web, the first web path A may also be designated as a "white last" path.

As an alternative to the first web path A a second web path B is provided.

The second web path B also starts at the entry unit 14 where the web 12 is wound around the first auxiliary entry roller 18*a*, the entry roller 16 and the second auxiliary entry roller 18*b*.

From there it directly extends to the fifth deviating roller 62 and subsequently travels along the front sides of all printing units 26 to 38 until it reaches the third deviating roller 56.

During its travel along the printing units 26 to 38, the second web path B is supported by the sixth deviating roller 64 and the support rollers 58*a* to 58*c*.

Consequently, the web 12 travelling along the second web path B will receive white ink first. Subsequently, it may receive ink of the colors orange, violet, cyan, magenta, yellow and black.

Thus, the second web path may be called a "white first" path.

Again, the white ink is pre-cured by the pinning unit 44 being arranged adjacent to the printing unit 26.

From the third deviating roller 56 the second web path B extends over the fourth deviating roller 60 and the seventh deviating roller 66 until it reaches the curing unit 46, more precisely the supporting roller 48.

After having passed the supporting roller 48 it reaches the exit unit 20 via the eights deviating roller 68, the ninth deviating roller 70 and an eleventh deviating roller 74.

It can be seen from the above explanations that each of the web paths A, B passes by all of the printing units 26 to 38. Consequently, independent from the web path A, B used, all colors may be printed on the web 12.

However, the sequences by which the printing units 26 to 38 are passed differ.

In the present example, in which the printing units 26 to 38 are subdivided into a first printing unit group and a second printing unit group, the differing sequence also applies to these printing unit groups.

It is noted that in this context only the first web path A comprises a portion extending through the gap 42.

Furthermore, along both web paths A, B the curing unit 46 is arranged between the printing units 26 to 38 and the web exit unit 20.

In FIG. 2 a second example of the printing machine 10 is shown.

The printing machine 10 according to the second example only differs from the printing machine 10 according to the first example in that two coupling units 76, 78 for mounting the pinning unit 44 within the printing machine 10 are provided.

Thus, the pinning unit 44 may selectively be coupled to one of the coupling units 76, 78.

In other words, depending on the printing job to be performed and on the web path A, B used the pinning unit 44 can either be arranged adjacent to the printing unit 26 via coupling unit 76 or adjacent to the printing unit 28 via coupling unit 78.

A method for changing a color sequence within a printing process can be performed in connection with both examples of the printing machine 10.

This method starts form a given color sequence within a printing process which is for example determined in that the web 12 is arranged within the printing machine 10 such that it travels along the first web path A.

In order to change the color sequence, the web 12 will be re-arranged to the second web path B.

The same applies if the method starts from a given color sequence being determined in that the web 12 is arranged along the second web path B. Then, the web 12 will be re-arranged to the first web path A.

In connection with the above examples the web paths A, B with differing color sequences have been explained using the printing unit 26 being configured for applying white ink to the substrate as an example. However, it is clear that a change in color sequence can also be performed with respect to any other color or group of colors. To this end, for example the position of the gap 42 can altered.

The invention claimed is:

1. A printing machine, especially a label printing machine and a machine for printing flexible packaging, for printing on a substrate having a form of a web, the printing machine comprising:
- a web entry unit for receiving the web on which a printing process is to be performed,
- a web exit unit for dispensing the web after the printing process, and
- at least two printing units, wherein each of the at least two printing units is configured for applying an ink of a predetermined color on the web,
- wherein at least two web paths are provided between the web entry unit and the web exit unit, each of the at least two web paths passing by the at least two printing units in a traveling direction, and
- wherein the at least two web paths pass by the at least two printing units in a differing sequence, whereas the traveling direction of the web is the same for the at least two web paths.

2. The printing machine according to claim 1, wherein the at least two printing units are arranged along a substantially straight or arched line.

3. The printing machine according to claim 1, wherein the entry unit and the exit unit are arranged on the same side of the at least two printing units.

4. The printing machine according to claim 1, wherein a gap is located between the at least two printing units, wherein only a first one of the at least two web paths comprises a portion extending through the gap.

5. The printing machine according to claim 4, wherein a second one of the at least two web paths, along a travelling direction of the second one of the at least two web paths, passes by a first one of the at least two printing units and subsequently passes by a second one of the at least two printing units.

6. The printing machine according to claim 1, wherein the at least two printing units are ink jet printing units or laser printing units.

7. The printing machine according to claim 1, further comprising:
- at least one pinning unit, wherein the pinning unit is arranged adjacent to one of the at least two printing units.

8. The printing machine according to claim 7, further comprising:
- at least two coupling units for mounting the at least one pinning unit within the printing machine, wherein the at least one pinning unit may be selectively coupled to any one of the at least two coupling units.

9. The printing machine according to claim 1,
- wherein the at least two printing units include at least three printing units, being subdivided into two printing unit groups, wherein the at least two web paths pass by the at least two printing unit groups in a differing sequence.

10. The printing machine according to claim 1, further comprising:
- a curing unit, wherein the curing unit is arranged between the at least two printing units and the web exit unit in respect of the at least two web paths.

11. The printing machine according to claim 1, wherein each of the at least two printing units has a single, fixed position within the printing machine.

12. The printing machine according to claim 1, wherein the at least two printing units include one single printing unit per color.

13. The printing machine according to claim 1, wherein the at least two printing units are configured for applying an ink of white color.

14. A printing machine, especially a label printing machine and a machine for printing flexible packaging, for printing on a substrate having a form of a web, the printing machine comprising:
- a web entry unit for receiving the web on which a printing process is to be performed,
- a web exit unit for dispensing the web after the printing process, and
- at least two printing units, wherein each of the at least two printing units is configured for applying an ink of a predetermined color on the web,
- wherein at least two web paths are provided between the web entry unit and the web exit unit, each of the at least two web paths passing by the at least two printing units,
- wherein the at least two web paths pass by the at least two printing units in a differing sequence, whereas a traveling direction of the web remains the same,
- wherein a gap is located between the at least two printing units, wherein only a first one of the at least two web paths comprises a portion extending through the gap, and
- wherein the first one of the at least two web paths, along a travelling direction of the first one of the at least two web paths, extends through the gap, subsequently passes by a second one of the at least two printing units and subsequently passes by a first one of the at least two printing units.

15. The printing machine according to claim 14, wherein the first one of the at least two web paths, along the travelling direction of the first one of the at least two web paths, extends through the gap after having passed by the first one of the at least two printing units.

16. A method for changing a color sequence within a printing process, especially a label printing process, performed by a printing machine configured for printing on a substrate having a form of a web and comprising at least two printing units, wherein each of the at least two printing units is configured for applying an ink of a predetermined color on the web, and wherein the web is arranged along an alternative web paths passing by the at least two printing units in a traveling direction and in a differing sequence, whereas the travelling direction of the web is the same for the alternative web paths.

17. The method according to claim 16, wherein, for both of the alternate paths, the web enters the printing machine at a same first location, and the web exits the printing machine at a same second location.

18. A printing machine, especially a label printing machine and a machine for printing flexible packaging, for printing on a substrate having a form of a web, the printing machine comprising:

a web entry unit for receiving the web on which a printing process is to be performed, a web exit unit for dispensing the web after the printing process, and first, second, and third printing unit configured for applying an ink of first, second, and third colors respectively on the web, wherein two web paths are provided between the web entry unit and the web exit unit, each of the two web paths passing by the first, second, and third printing units in a same traveling direction, and wherein a first web path of the two web paths passes the first printing unit after passing the second and third printing units in a sequence, and a second web path of the two web paths passes the first printing unit before passing the second and third printing units in the same sequence.

* * * * *